United States Patent
Tripathi et al.

(10) Patent No.: US 10,614,102 B2
(45) Date of Patent: Apr. 7, 2020

(54) METHOD AND SYSTEM FOR CREATING ENTITY RECORDS USING EXISTING DATA SOURCES

(71) Applicant: Innoplexus AG, Eschborn (DE)

(72) Inventors: Gaurav Tripathi, Pune (IN); Vatsal Agarwal, Rampur (IN); Yannik T. H. Schelske, Eschborn (DE); Nikhil Vinod Fulzele, Nagpur (IN); Arpan Sheetal, Haranganj (IN)

(73) Assignee: Innoplexus AG, Eschborn (DE)

( * ) Notice: Subject to any disclaimer, the term of this patent is extended or adjusted under 35 U.S.C. 154(b) by 280 days.

(21) Appl. No.: 15/855,902

(22) Filed: Dec. 27, 2017

(65) Prior Publication Data

US 2019/0005112 A1 Jan. 3, 2019

Related U.S. Application Data

(60) Provisional application No. 62/462,414, filed on Feb. 23, 2017.

(51) Int. Cl.
*G06F 16/00* (2019.01)
*G06F 16/28* (2019.01)
(Continued)

(52) U.S. Cl.
CPC ............ *G06F 16/285* (2019.01); *G06F 16/13* (2019.01); *G06F 16/288* (2019.01); *G06F 16/3332* (2019.01); *G06F 17/278* (2013.01)

(58) Field of Classification Search
CPC .... G06F 16/288; G06F 17/278; G06F 16/285; G06F 16/3332; G06F 16/13; G06F 16/35; G06F 16/248; G06F 16/24578
See application file for complete search history.

(56) References Cited

U.S. PATENT DOCUMENTS 8,266,168 B2 * 9/2012 Bayliss ................. G06F 16/285
707/758
8,484,211 B2 * 7/2013 Bayliss ............. G06F 16/24578
707/736
(Continued)

FOREIGN PATENT DOCUMENTS

EP 2270193 A1 * 1/2011 ............ C09D 11/52

*Primary Examiner* — Cheryl Lewis
(74) *Attorney, Agent, or Firm* — Ziegler IP Law Group, LLC

(57) ABSTRACT

A method and a system for creating entity records. The method includes extracting data records from existing data sources, the data records including entity names and attributes associated therewith; identifying the entity names and attributes corresponding thereto, in each extracted data record; classifying identified entity attributes, based on attribute signatures associated therewith; clustering data records based on similar classified entity attributes and/or similar entity names; comparing entity attributes in clustered data records to identify entity attributes with missing attributes data; assigning representative attributes data to entity attributes with missing attributes data; combining clustered data records to form entity record segments; clustering entity record segments based on similar identity signatures thereof; comparing relevant entity attributes of clustered entity record segments to identify entity record segments having a relation therebetween; and combining related entity record segments to form entity records.

17 Claims, 3 Drawing Sheets

(51) Int. Cl.
*G06F 16/13* (2019.01)
*G06F 16/33* (2019.01)
*G06F 17/27* (2006.01)

(56) References Cited

U.S. PATENT DOCUMENTS

| | | | |
|---|---|---|---|
| 8,495,077 B2* | 7/2013 | Bayliss | G06F 16/285 |
| | | | 707/758 |
| 8,510,323 B2* | 8/2013 | Eshwar | G06F 16/2465 |
| | | | 707/765 |
| 8,965,914 B2* | 2/2015 | Eshwar | G06F 16/2465 |
| | | | 707/765 |
| 9,058,380 B2* | 6/2015 | Lesiecki | G06F 16/2468 |
| 2019/0205318 A1* | 7/2019 | Tripathi | G06F 16/288 |

* cited by examiner

METHOD AND SYSTEM FOR CREATING ENTITY RECORDS USING EXISTING DATA SOURCES

CROSS REFERENCE TO RELATED APPLICATIONS

This application claims priority to U.S. Provisional Patent Application No. 62/462,414, filed Feb. 23, 2017, which is hereby incorporated by reference in its entirety.

TECHNICAL FIELD

The present disclosure relates generally to data processing; and more specifically, to methods for extraction of entity records from existing data sources. Furthermore, the present disclosure also relates to systems for extraction of entity records from existing data sources. Moreover, the present disclosure also relates to computer readable medium containing program instructions for execution on a computer system, which when executed by a computer, cause the computer to perform method steps for creating entity records using existing data sources.

BACKGROUND

In recent times, technology has touched almost every part of human life. Generally, there is a lot of scope for research work for further advancement of technology in various fields. Specifically, research inspires innovation and promotes learning in community of scholars, scientists and inventors. Furthermore, there are a number of platforms available that provide data and content needed for carrying out the research work. Conventionally, printed media used to act as source of data needed for the research work. However, with technological evolution digital media has now replaced the printed media as an information source with easy accessibility and improved availability thereof. Additionally, the digital data containing data records may be stored in a database.

Generally, retrieving data spread across various centralized and/or distributed database is performed by using various existing techniques. Specifically, the existing techniques act upon search strings pertaining to a search entity name provided thereto. Subsequently, the existing techniques access the data sources and retrieve most relevant data records from various existing data sources. However, such existing data sources include many identical entity names that are contextually different. Subsequently, such entity names and attributes associated thereto get treated as relevant data records by the existing techniques.

However, the existing techniques suffer with numerous performance issues. Specifically, the existing techniques retrieve data only from homogeneous platforms. Additionally, the existing techniques are unable to extract data from existing data sources having heterogeneous (namely, different) format. Furthermore, data records that are extracted using the existing techniques involve a lot of processing and time complexity as it includes ambiguous data therein. Furthermore, the retrieved data may not essentially belong to specific searched entity name rather to an identical entity name with different intent (namely, resolution). Additionally, the retrieval of data using the existing techniques is complex in nature as it requires human involvement in order to refine the search results containing data records containing many identical entity names and attributes associated therewith. Consequently, such retrieval of data consumes a lot of human effort and time.

Therefore, in light of the foregoing discussion, there exists a need to overcome the aforementioned drawbacks associated with the existing techniques of entity name resolution.

SUMMARY

The present disclosure seeks to provide a method for creating entity records using existing data sources. The present disclosure also seeks to provide a system for creating entity records using existing data sources. The present disclosure seeks to provide a solution to the existing problem of ambiguous, unmanageable, unstructured, time consuming and inefficient extraction of entity records using existing data sources. An aim of the present disclosure is to provide a solution that overcomes at least partially the problems encountered in prior art, and provide an unambiguous, seamless, faster and optimized method for creating entity records using existing data sources with a notion of relevance pertaining to user's field of interest.

In first aspect, an embodiment of the present disclosure provides a method of creating entity records using existing data sources, wherein the method comprising:
  extracting data records from the existing data sources, wherein the data records comprise entity names and entity attributes associated with the entity names;
  identifying the entity names, and entity attributes corresponding to each of the entity names in each of the extracted data records;
  classifying the identified entity attributes, based on an attribute signature associated with each of the identified entity attributes;
  clustering the data records based on similar classified entity attributes and/or similar entity names;
  comparing the entity attributes in the clustered data records to identify entity attributes with missing attributes data in each of the data records;
  assigning representative attributes data to the entity attributes with missing attributes data;
  combining the clustered data records to form entity record segments, wherein each of the entity record segments comprises relevant entity attributes corresponding to a relevant entity name;
  clustering the entity record segments based on similar identity signature of each of the entity record segments;
  comparing the relevant entity attributes of the clustered entity record segments to identify entity record segments having a relation therebetween; and
  combining the related entity record segments to form the entity records.

In second aspect, an embodiment of the present disclosure provides system for creating entity records using existing data sources, wherein the system comprising:
  a database arrangement operable to store existing data sources; and
  a processing module operatively coupled to the database arrangement, the processing module operable to:
    extract data records from the existing data sources, wherein the data records comprise entity names and entity attributes associated with the entity names;
    identify the entity names, and entity attributes corresponding to each of the entity names in each of the extracted data records;

classify the identified entity attributes, based on an attribute signature associated with each of the identified entity attributes;

cluster the data records based on similar classified entity attributes and/or similar entity names;

compare the entity attributes in the clustered data records to identify entity attributes with missing attributes data in each of the data records;

assign representative attributes data to the entity attributes with missing attributes data;

combine the clustered data records to form entity record segments, wherein each of the entity record segments comprises relevant entity attributes corresponding to a relevant entity name;

cluster the entity record segments based on similar identity signature of each of the entity record segments;

compare the relevant entity attributes of the clustered entity record segments to identify entity record segments having a relation therebetween; and combine the related entity record segments to form the entity records.

In third aspect, an embodiment of the present disclosure provides a computer readable medium containing program instructions for execution on a computer system, which when executed by a computer, cause the computer to perform method steps for creating entity records using existing data sources, the method comprising the steps of:

extracting data records from the existing data sources, wherein the data records comprise entity names and entity attributes associated with the entity names;

identifying the entity names, and entity attributes corresponding to each of the entity names in each of the extracted data records;

classifying the identified entity attributes, based on an attribute signature associated with each of the identified entity attributes;

clustering the data records based on similar classified entity attributes and/or similar entity names;

comparing the entity attributes in the clustered data records to identify entity attributes with missing attributes data in each of the data records;

assigning representative attributes data to the entity attributes with missing attributes data;

combining the clustered data records to form entity record segments, wherein each of the entity record segments comprises relevant entity attributes corresponding to a relevant entity name;

clustering the entity record segments based on similar identity signature of each of the entity record segments;

comparing the relevant entity attributes of the clustered entity record segments to identify entity record segments having a relation therebetween; and combining the related entity record segments to form the entity records.

Embodiments of the present disclosure substantially eliminate or at least partially address the aforementioned problems in the prior art, and enables an efficient and unambiguous extraction of entity records from existing data sources with entity name resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1A:
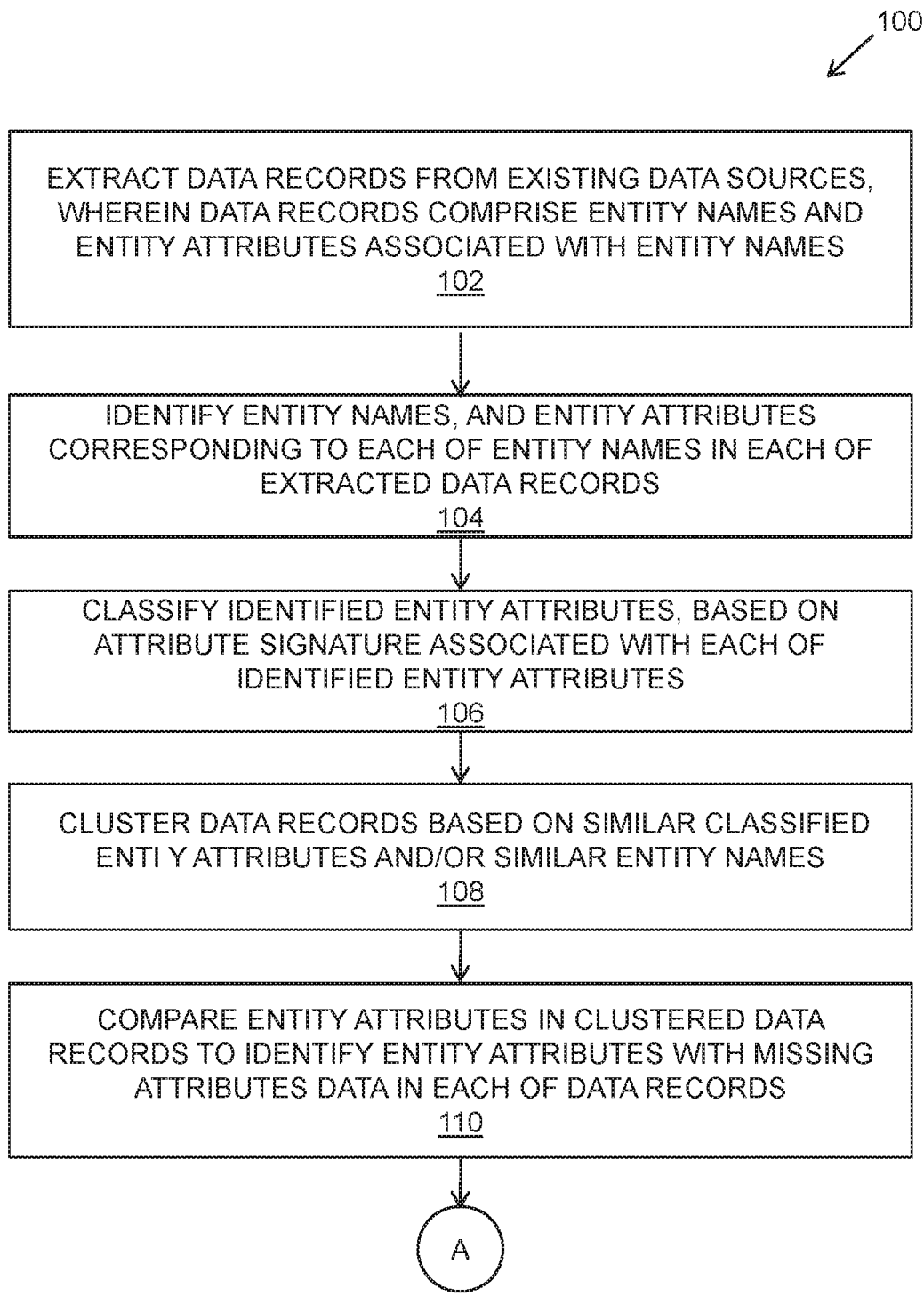
FIGS. 1A-1B illustrate steps of a method for creating entity records using existing data sources, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of creating entity records using existing data sources, wherein the method comprising:

extracting data records from the existing data sources, wherein the data records comprise entity names and entity attributes associated with the entity names;

identifying the entity names, and entity attributes corresponding to each of the entity names in each of the extracted data records;

classifying the identified entity attributes, based on an attribute signature associated with each of the identified entity attributes;

clustering the data records based on similar classified entity attributes and/or similar entity names;

comparing the entity attributes in the clustered data records to identify entity attributes with missing attributes data in each of the data records;

assigning representative attributes data to the entity attributes with missing attributes data;

combining the clustered data records to form entity record segments, wherein each of the entity record segments comprises relevant entity attributes corresponding to a relevant entity name;

clustering the entity record segments based on similar identity signature of each of the entity record segments;

comparing the relevant entity attributes of the clustered entity record segments to identify entity record segments having a relation therebetween; and combining the related entity record segments to form the entity records.

In another aspect, an embodiment of the present disclosure provides a system for creating entity records using existing data sources, wherein the system comprising:

a database arrangement operable to store existing data sources; and a processing module operatively coupled to the database arrangement, the processing module operable to:

extract data records from the existing data sources, wherein the data records comprise entity names and entity attributes associated with the entity names;

identify the entity names, and entity attributes corresponding to each of the entity names in each of the extracted data records;

classify the identified entity attributes, based on an attribute signature associated with each of the identified entity attributes;

cluster the data records based on similar classified entity attributes and/or similar entity names;

compare the entity attributes in the clustered data records to identify entity attributes with missing attributes data in each of the data records;

assign representative attributes data to the entity attributes with missing attributes data;

combine the clustered data records to form entity record segments, wherein each of the entity record segments comprises relevant entity attributes corresponding to a relevant entity name;

cluster the entity record segments based on similar identity signature of each of the entity record segments;

compare the relevant entity attributes of the clustered entity record segments to identify entity record segments having a relation therebetween; and combine the related entity record segments to form the entity records.

The present disclosure provides the aforementioned method for achieving entity name resolution using existing data sources. Furthermore, the method reduces a large amount of data records stored in the existing data sources to an easily manageable set of entity records. Specifically, the method reduces ambiguity in identical entity names and provides only identified entity records related to the user's field of interest. Furthermore, the described method provides a simpler and optimal way of with entity name resolved retrieval of data from existing data sources. Beneficially, the described method enables extraction of data in different formats and stored at heterogeneous platforms. Additionally, the method described herein does not require human intervention for functioning thereof. Furthermore, the method exhibits a very low computational (namely, processing) and time complexity. Moreover, the system described herein is simple and inexpensive.

Throughout the present disclosure, the term "existing data sources" relates to organized or unorganized bodies of digital information regardless of manner in which data is represented therein. Optionally, the existing data sources are structured and/or unstructured. Optionally, the existing data sources may be hardware, software, firmware and/or any combination thereof. For example, the existing data sources may be in form of tables, maps, grids, packets, datagrams, files, documents, lists or in any other form. The existing data sources include any data storage software and systems, such as, for example, a relational database like IBM, DB2, Oracle 9 and so forth. Moreover, the existing data sources may include the data in form of text, audio, video, image and/or a combination thereof.

As mentioned previously, the system for creating entity records using existing data sources comprises a database arrangement operable to store existing data sources. Furthermore, the database arrangement operable to store the existing data sources may be distributed and/or centralized. Furthermore, the existing data sources are used to create the entity records. Additionally, a processing module is operatively coupled to the database arrangement. Furthermore, the processing module is operable to analyze (namely, process) the existing data sources in order to extract data records for creating the entity records.

Furthermore, the processing module may be operable to communicate with the database arrangement over a network. Moreover, the term "network" relates to an arrangement of interconnected programmable and/or non-programmable components that are configured to facilitate data communication between one or more electronic devices and/or databases, whether available or known at the time of filing or as later developed. Furthermore, the network may include, but is not limited to, one or more peer-to-peer network, a hybrid peer-to-peer network, Local Area Networks (LANs), Radio Access Networks (RANs), Metropolitan Area Networks (MANs), Wide Area Networks (WANs), all or a portion of a public network such as a global computer network known as Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed.

Throughout the present disclosure, the term "entity records" refers to structured (namely, organized) collection of the data (namely, elements) based on contextual association therebetween. Optionally, the data in the entity records may have different data types, string length (namely, number of bits) and size, wherein size of the data refers to memory space consumed in order to store the data. Additionally, the entity records are most relevant and unambiguous data related to the user's field of interest. Moreover, the entity records may include the data in the form of text, audio, video, image and/or a combination thereof. Specifically, the entity records are obtained by processing (namely, refining) the data records.

As mentioned previously, the existing data source includes the data records. Furthermore, the method for creating entity records using existing data sources comprises extracting data records from the existing data sources. Moreover, the processing module is operable to extract data records from the existing data sources. The term "data records" relates to information retrieved by extracting the existing data records. Specifically, the data records may have scattered, repetitive, inconsistent and/or missing values. Moreover, the data records may include data in form of text, audio, video, image and/or a combination thereof. For example, the data records may be in form of tables, maps, grids, packets, datagrams, files, documents, lists or in any other form.

Furthermore, the data records comprise entity names, and entity attributes associated with the entity names. Specifically, the term "entity name" and "entity attributes" relate to subject of information included in the data records. Specifically, the data records include information related to the entity name. Optionally, the entity names may belong to one or more persons, organizations, objects, domains and so forth. Furthermore, the data records include fields of information about the entity names. Specifically, fields of information about the entity names are entity attributes. Additionally, the entity attributes may include data in form of text, audio, video, image and/or a combination thereof. Furthermore, the entity attributes may be analyzed in order to obtain unambiguous information pertaining to the entity name. Optionally, the data records may be in a tabular form. Additionally, first cell in a column may include the entity name and remaining cells in the column may include the entity attributes.

As a first example, the existing data sources may comprise information about a person with the name "James Williams". Consequently, the information may be included in multiple, scattered data records. Specifically, a first data record with an entity name "James Williams" may comprise information such as telephone number and birthdate associated therewith. Additionally, a second data record with an entity name "James H. Williams" may comprise information such as birthdate and correspondence address associated therewith. Therefore, an entity record may be created with "James H. Williams" with the information such as telephone number, birthdate and the correspondence address associated with the entity record. Furthermore, the existing data sources may include more than one profile for "James Williams" that may not be related to another person. Consequently, the data records may include ambiguous and non-relevant information regarding the entity name of the suspect. Therefore, the data records may be further processed in order to obtain entity records pertaining to the entity name of such persons. Specifically, the entity records of the suspect include the entity names and the entity attributes related to the person and thereby discarding information pertaining to some other similar entity name.

Optionally, a user may intend to extract more than one entity name and entity attributes associated therewith. In an example, a business analyst may intend to collect data regarding various competing companies. Consequently, the business analyst may have a need to analyze information separately for each of the competing companies. Therefore, each of the competing companies may act as an entity name and may have various similar as well as distinct entity attributes associated therewith.

Optionally, extracting data records from the existing data sources comprises cleaning and/or translating the data records. Furthermore, cleaning the data records refers to removal of unnecessary comments, annotations, symbols, images and/or a combination thereof. Consequently, the processor extracts only relevant information from the existing data sources. Moreover, translating the data records refers to conversion thereof to a machine readable form. Beneficially, cleaning and/or translating the data records reduce processing complexity thereof. Additionally, cleaning and/or translating the data records also reduce processing time for creating the entity record.

As mentioned previously, the method for creating entity records using existing data sources comprises identifying the entity names, and entity attributes corresponding to each of the entity names in each of the extracted data records. Specifically, the processing module is operable to identify the entity names, and entity attributes corresponding to each of the entity names in each of the extracted data records. Furthermore, elements in the data records are analyzed in order to identify syntactical meaning thereof. Consequently, subject of elements in the data records is established as entity names and entity attributes. Additionally, entity attributes provide additional information pertaining to the entity names. Optionally, a dedicated and adaptive subroutine may extract the entity attributes that may pertain to the entity names. Furthermore, the identified entity names and entity attributes may not be optimal and may need further processing in order to provide useful and unambiguous information.

Optionally, identifying the entity names and the entity attributes corresponding to each of the entity names comprises associating an importance factor with each of the entity attributes. Furthermore, the importance factor may be a digit, a symbol, a text, a comment and/or a combination thereof. Optionally, the association between the importance factor and each of the entity attributes may be facilitated by using a pointer. Beneficially, the importance factor may identify a notion of relevance of each of the entity attributes. Moreover, an entity attribute that is more likely to be unique among different data records may have a higher importance factor. For example, an entity attribute such as a telephone number may have a higher importance factor as the probability of two data records of two different entities having the same telephone number, as an entity attribute, is low. Furthermore, an entity attribute that may be similar for data records of more than one entities may have a lower importance factor. For example, data records of multiple entities may have a same birthdate as the entity attribute.

As mentioned previously, the method for creating entity records using existing data sources comprises classifying the identified entity attributes, based on an attribute signature associated with each of the identified entity attributes. Specifically, the processing module is operable to classify the identified entity attributes, based on an attribute signature associated with each of the identified entity attributes. Furthermore, association of attribute signature with each of the identified entity attributes provides information regarding context of the identified entity attributes. Additionally, the entity attributes of same class have an identical or similar attribute signature associated therewith.

Throughout the present disclosure the term "attribute signature" relates to a number, a text, a string, a set of bits operable to classify the entity attribute based on information provided thereby. Furthermore, the attributes signature associated with each of the identified entity attributes may be generated by analyzing intent of the entity attributes. Optionally, the method for creating entity records using existing data sources further comprises predefining the attributes signature. Moreover, the user may be able to define the attribute signature to be used in order to classify the entity attributes. Beneficially, the processing module may be operable to generate the attributes signature associated with each of the identified entity attributes.

In an example, the identified attributes may be classified in three classes namely, personal (for example date of birth, place of origin, e-mail id, contact number and so forth), contextual (for example, relationships, hobbies, interests and so forth) and a separate class for including all other features. Furthermore, classification of the entity attributes may be performed by classifying similar entity records based on the attributes signature thereof that combines personal and contextual attributes. The attributes signature associated with each of the identified entity attributes may be analyzed in order to perform classification of the identified entity attributes.

As mentioned previously, the method for creating entity records using existing data sources comprises clustering the data records based on similar classified entity attributes and/or similar entity names. Specifically, the processing module is operable to cluster the data records based on similar classified entity attributes and/or similar entity names. Moreover, clustering the data records refers to collection of data records in a single storage location (namely, file, data structure and so forth). Moreover, the data records clustered together exhibit a high probability of association with exact same entity name thereof. In addition, similarity of the entity attributes may be calculated by comparison thereof with each of the entity attributes. Additionally, the comparison of the entity attributes may be performed by applying a subroutine of low computational complexity thereon.

As mentioned previously, the method for creating entity records using existing data sources comprises comparing the entity attributes in the clustered data records to identify entity attributes with missing attributes data in each of the data records. Specifically, the processing module is operable to compare the entity attributes in the clustered data records to identify entity attributes with missing attributes data in each of the data records. Furthermore, the clustered data records have a high probability of having exact same entity name associated therewith. Therefore, comparison of the entity attributes in the clustered data provides information regarding the missing entity attributes by comparison thereof. Additionally, entity attributes with missing data relate to entity attributes with a value in one data record but not in another. Specifically, the comparison of the entity attributes in the clustered data records identifies presence or absence of data in an entity attribute in a data record.

In an example, the clustered data records may be plotted against the entity attributes in a matrix to compare and identify the entity attributes with missing attributes data. Specifically, the entity attributes of each of the data record in the clustered data records may be compared with entity attributes of remaining data records in the clustered data record to identify the entity attributes with missing attributes data.

Referring to the first example, the first data record with the entity name "James Williams" may have entity attributes such as telephone number and birthdate associated therewith. Similarly, the second data record with the entity name "James H. Williams" may comprise information such as birthdate and correspondence address associated therewith. Consequently, the first and the second data record may be clustered. Subsequently, the entity attributes in the clustered data record may be compared. Therefore, comparing the entity attributes in the clustered data record may identify the entity attributes with missing attributes data in first and second data record, such as correspondence address in the first data record and telephone number in second data record.

As mentioned previously, the method for creating entity records using existing data sources comprises assigning representative attributes data to the entity attributes with missing attributes data. Specifically, the processing module is operable to assign representative attributes data to the entity attributes with missing attributes data. Beneficially, assigning representative attributes data to the entity attributes with missing attributes data increases information density in the clustered data records. Moreover, it is to be understood that clustered data records containing entity attributes with missing attributes data have lower information density. Beneficially, assigning representative attributes data to the entity attributes with missing attributes data provides an interface in order to authenticate the data records. Specifically, once representative attributes data has been assigned to the entity attributes with missing attributes data, in case of any mismatch occurring between the entity names and the entity attributes associated therewith reflects irrelevant and incorrect data records included in the cluster.

Furthermore, the identified invalid data records may be discarded keeping only relevant data records in the cluster. Additionally, relevant data records relate to the data records comprising entity attributes associated with a particular entity.

Optionally, the method for creating entity records using existing data sources comprises assigning the representative attributes data to entity attributes with missing attributes data is based on frequencies of entity attributes corresponding to the entity attributes with missing attributes data in the clustered data records. Specifically, the processing module is operable to assign the representative attributes data to entity attributes with missing attributes data based on frequencies of entity attributes corresponding to the entity attributes with missing attributes data in the clustered data records. Furthermore, entity attributes with missing attributes data in one data record may be checked in the remaining data records included in the cluster. Subsequently, the attributes data with maximum number of appearances in the remaining data records exhibits maximum frequency. Consequently, the attribute data, with maximum number of appearances associated with entity attribute that exhibits missing attribute data in at least one data record included in the cluster, may be assigned as the representative attributes data.

Referring to the first example, comparison of entity attributes of the clustered data records may reflect that one of the clustered data records may not include attribute data for entity attribute "telephone number" associated with the entity name "James Williams". Subsequently, the data attribute with maximum number of appearances may be assigned as the representative attribute data to the entity attribute "contact number" in the clustered data record that includes the entity attribute with missing attribute data.

Optionally, the method for creating entity records using existing data sources comprises assigning the representative attributes data to entity attributes with missing attributes data based on importance factor of each of entity attributes, corresponding to the entity attributes with missing attributes data, in the clustered data records. Specifically, the processing module is operable to assign the representative attributes data to entity attributes with missing attributes data based on importance factor of each of entity attributes corresponding to the entity attributes with missing attributes data in the clustered data records. Furthermore, entity attributes with missing attributes data in one data record may be checked in the remaining data records included in the cluster. Subsequently, the attributes data with highest importance factor in the remaining data records may be assigned as the representative attributes data for the entity attribute with missing attributes data. Furthermore, a high importance factor reduces probability of incorrect identification of entity attributes associated with the entity name. Consequently, assigning the representative attribute data based on the importance factor has a high probability of generating an unambiguous data In an embodiment, assigning representative attributes data to the entity attributes with missing attributes data may be based on both frequency as well as importance factor of each of entity attributes.

As mentioned previously, the method for creating entity records using existing data sources comprises combining the clustered data records to form entity record segments, wherein each of the entity record segments comprises relevant entity attributes corresponding to a relevant entity name. Specifically, the processing module is operable to combine the clustered data records to form entity record segments, wherein each of the entity record segments comprises relevant entity attributes corresponding to a relevant entity name. Beneficially, combining the clustered data records eliminates irrelevant data records and/or entity attributes included in the cluster. Furthermore, each of the entity record segments relates to a single unit of data record comprising relevant entity name and relevant entity attributes corresponding to the relevant entity name. Specifically, relevant entity name relates to the entity name that certainly belongs to user's field of interest. Moreover, relevant entity attribute corresponding to the relevant entity name refers to unambiguous and certain information associated with the relevant entity name.

Specifically, combining the clustered entity records may eliminate irrelevant (namely, unwanted, incorrect, ambiguous and so forth) entity names and entity attributes associated with the entity names. Optionally, the clustered entity records may be combined in form of a table, a file, a heap, a tree and/or some other data structure.

Referring to the first example, the clustered data records including entity attributes associated with the entity name "James Williams" may be combined to form entity record segments. Furthermore, the clustered data records may have included entity attributes that may not be associated with the exact same entity name "James Williams". Consequently, combining the clustered data records exhibits ambiguous information associated with the entity name "James Williams". Subsequently, ambiguous entity names and entity attributes associated with the ambiguous entity name may be eliminated from the cluster.

Optionally, the clustered data records are combined to form the entity records segments based on NER algorithms. Specifically, the processing module is operable to combine the clustered data records to form the entity record segments based on NER algorithms. Furthermore, NER algorithms relate to Named-Entity Recognition algorithms. It will be appreciated that NER algorithms may perform task of entity identification (namely, entity chunking, entity extraction and so forth) by locating and classifying entity names in clustered data records into pre-defined categories like name of persons, organizations, locations, expressions of times, quantities, monetary values, percentage and so forth.

As mentioned previously, the method for creating entity records using existing data sources comprises clustering the entity record segments based on similar identity signature of each of the entity record segments. Specifically, the processing module is operable to cluster the entity record segments based on similar identity signature of each of the entity record segments. Specifically, an identity signature is associated with each of the entity record segments, wherein entity record segments with similar entity attributes may have a similar identity signature. Furthermore, each of the entity record segments contains information pertaining to the relevant entity name. Therefore, it is to be understood that entity record segments contain relevant (namely, correct) information associated with the relevant entity name. Moreover, identity signature is operable to uniquely identify the entity record segments comprising the relevant entity. Moreover, clustering the entity record segments based on similar identity signature brings together the entity record segments that contain all the relevant entity names and entity attributes associated with the relevant entity names. Optionally, the entity record segments may be clustered together in file (namely, database, data storage, data structure and so forth).

Optionally, the method for creating entity records using existing data sources comprises the entity record segments are classified prior to clustering of entity record segments. Specifically, the processing module is operable to classify the entity record segments prior to clustering of the entity record segments. More specifically, information comprises in entity attributes of the entity record segments may be classified based on type of information provided thereby. Beneficially, classification of entity record segments may provide a way to extract specific set of information pertaining to user's field of interest.

As mentioned previously, the method for creating entity records using existing data sources comprises comparing the relevant entity attributes of the clustered entity record segments to identify entity record segments having a relation therebetween. Specifically, the processing module is operable to compare the relevant entity attributes of the clustered entity record segments to identify entity record segments having a relation therebetween. Furthermore, comparing the relevant entity attributes of the clustered entity record segments eliminates duplicate and unnecessary entity record segments. Additionally, comparing the relevant entity attributes of the clustered entity record segments provides heuristics (namely, information) regarding similarity of relevant entity names and relevant entity attributes associated therewith included in the entity record segments. It is to be understood that relation between the entity record segments relate to fact that information provided thereby refers to the exact same entity name. Consequently, comparing the relevant entity attributes of the clustered entity record segments facilitate a way of keeping most related and closest entity record segments together. Furthermore, the relation between the entity record segments is identified by information explicitly provided by the relevant entity attributes thereof and/or is deduced implicitly from the context of the relevant entity attribute thereof. In an example, a relation between two entity record segments may be identifies based on association thereof with another entity record segment. Specifically, information about such association may be provided by entity attributes of such entity record segments.

Optionally, relation between each of the entity record segments may be identified by using identity signature thereof. Furthermore, optionally, comparison of relevant entity attributes may be performed by applying a similarity measure technique such as cosine similarity measure, Jacard similarity measure, Euclidean Distance measure, Metric similarity measure and so forth.

As mentioned previously, the method for creating entity records using existing data sources comprises combining the related entity record segments to form the entity records. Specifically, the processing module operable to combine the related entity record segments to form the entity records. Furthermore, the related entity records include the unambiguous and relevant entity attributes related with the entity name pertaining to user's field of interest. Beneficially, the entity records provide desired data pertaining to the user's field of interest. Optionally, the related entity record segments may be combined in form a table.

In an embodiment, a data record may be combined with an entity record or an entity record segment based on similar entity attributes and/or entity names. Specifically, information from a data record may be added to an entity record after creation thereof. Beneficially, entity records may be continuously updated based on availability of new information from data sources which may not be previously extracted. Furthermore, the system for creating entity record may determine a probability of a particular data record belonging to a particular clustered data record. Specifically, the data record may be included in the clustered data record if such probability is above a threshold value. In an event that the probability of a particular data record belonging to any clustered data record does not surpass the threshold value, the particular data record may be included in any clustered data record at that stage. Furthermore, such data record may be included in a clustered data record after acquiring new information that may increase probability thereof above the threshold value.

Furthermore, there is disclosed a computer readable medium containing program instructions for execution on a computer system, which when executed by a computer, cause the computer to perform method steps for creating entity records using existing data sources, the method comprising the steps of extracting data records from the existing data sources, wherein the data records comprise entity names and entity attributes associated with the entity names; identifying the entity names, and entity attributes corresponding to each of the entity names in each of the extracted data records; classifying the identified entity attributes, based on an attribute signature associated with each of the identified entity attributes; clustering the data records based on similar classified entity attributes and/or similar entity names; comparing the entity attributes in the clustered data records to identify entity attributes with missing attributes data in each of the data records; assigning representative attributes data to the entity attributes with missing attributes data; combining the clustered data records to form entity record segments, wherein each of the entity record segments comprises relevant entity attributes corresponding to a relevant entity name; clustering the entity record segments based on similar identity signature of each of the entity record segments; comparing the relevant entity attributes of the clustered entity record segments to identify entity record segments having a relation therebetween; and combining the related entity record segments to form the entity records.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1B:
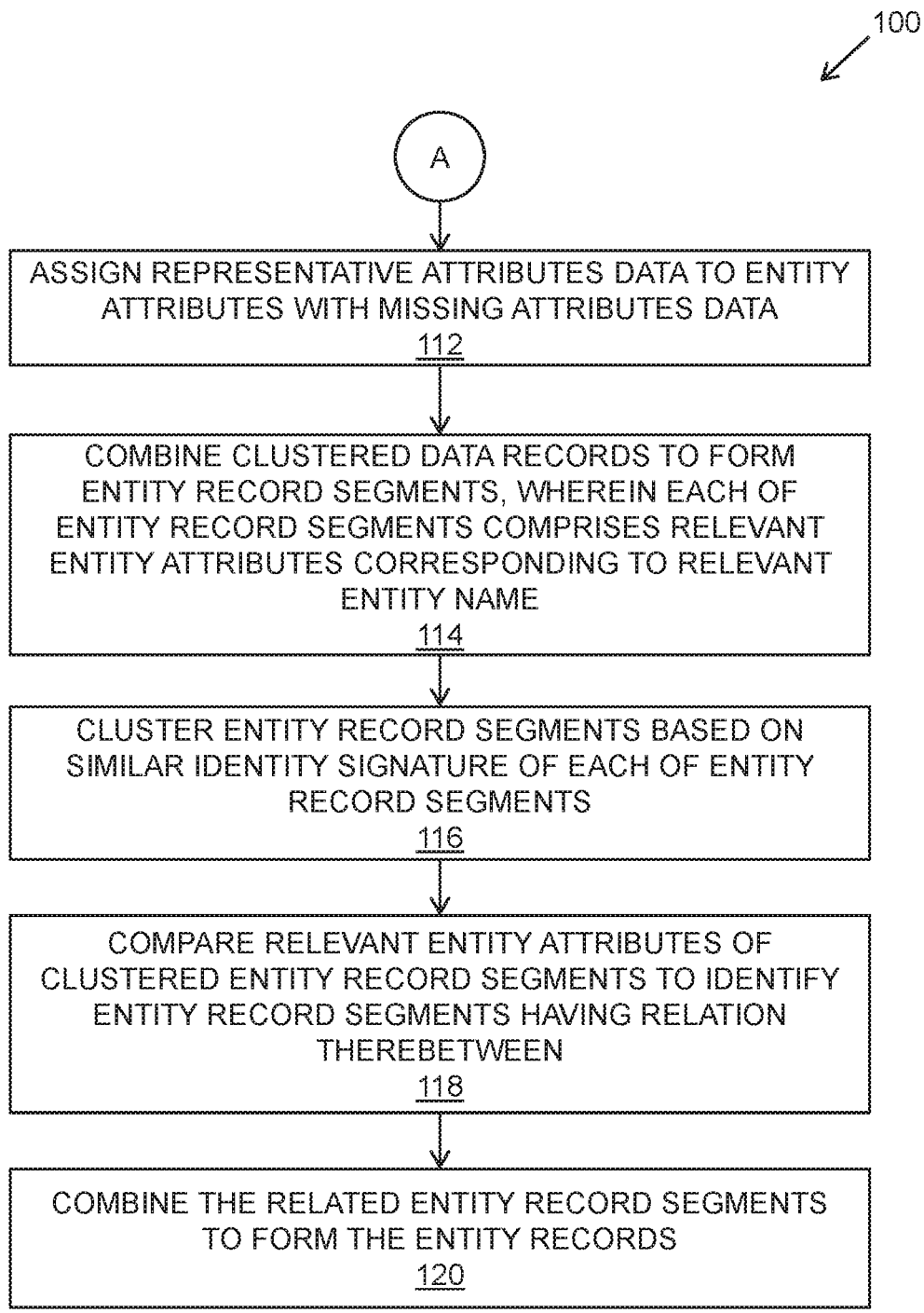

Referring to FIGS. 1A and 1B, illustrated are steps of a method 100 for creating entity records using existing data sources, in accordance with an embodiment of the present disclosure. The method 100 is executable by a processing module. At a step 102, data records are extracted from the existing data sources, wherein the data records comprise entity names and entity attributes associated with the entity names. At a step 104, the entity names, and entity attributes corresponding to each of the entity names in each of the extracted data records are identified. At a step 106, the identified entity attributes are classified based on an attribute signature associated with each of the identified entity attributes. At a step 108, the data records are clustered based on similar classified entity attributes and/or similar entity names. At a step 110, the entity attributes in the clustered data records are compared to identify entity attributes with missing attributes data in each of the data records. At a step 112, representative attributes data is assigned to the entity attributes with missing attributes data. At a step 114, the clustered data records are combined to form entity record segments, wherein each of the entity record segments comprises relevant entity attributes corresponding to a relevant entity name. At a step 116, the entity record segments are clustered based on similar identity signature of each of the entity record segments. At a step 118, the relevant entity attributes of the clustered entity record segments are compared to identify entity record segments having a relation therebetween. At a step 120, the related entity record segments are combined to form the entity record.

Figure 2:
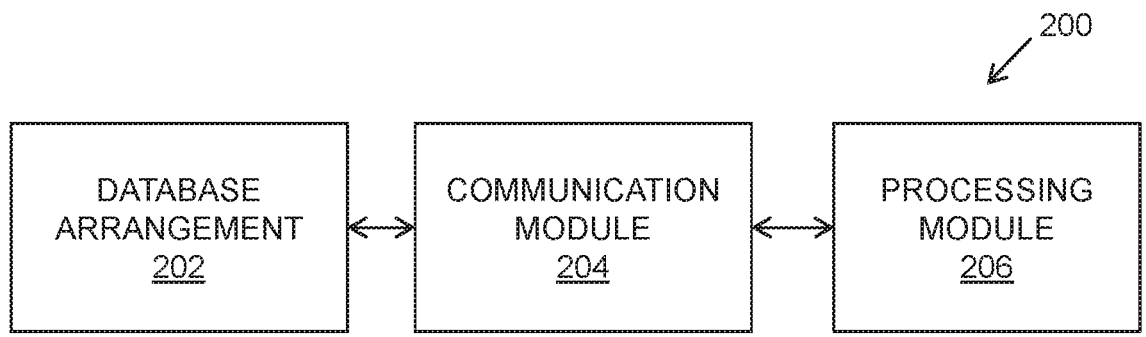
FIG. 2 is a block diagram of a system for creating entity records using existing data sources, in accordance with an embodiment of the present disclosure.

Referring to FIG. 2, illustrated is a block diagram of a system 200 for creating entity records using existing data sources, in accordance with an embodiment of the present disclosure. The system 200 comprises a database arrangement 202 operable to store existing data sources. Furthermore, the system 200 comprises a communication module 204. The communication module 204 is operatively coupled to the processing module 206 and the database arrangement 202. Furthermore, the communication module 204 provides an interface for communication of the processing module 206 and the database arrangement 202. The processing module 206 is operable to extract data records from the existing data sources, wherein the data records comprise entity names and entity attributes associated with the entity names.

What is claimed is:

1. A method of creating entity records using existing data sources, wherein the method comprising:
    extracting data records from the existing data sources, wherein the data records comprise entity names and entity attributes associated with the entity names;
    identifying the entity names, and entity attributes corresponding to each of the entity names in each of the extracted data records;
    classifying the identified entity attributes, based on an attribute signature associated with each of the identified entity attributes;
    clustering the data records based on similar classified entity attributes and/or similar entity names;
    comparing the entity attributes in the clustered data records to identify entity attributes with missing attributes data in each of the data records;
    assigning representative attributes data to the entity attributes with missing attributes data;
    combining the clustered data records to form entity record segments, wherein each of the entity record segments comprises relevant entity attributes corresponding to a relevant entity name;
    clustering the entity record segments based on similar identity signature of each of the entity record segments;
    comparing the relevant entity attributes of the clustered entity record segments to identify entity record segments having a relation therebetween; and
    combining the related entity record segments to form the entity records.

2. The method of claim 1, wherein the existing data sources are structured and/or unstructured.

3. The method of claim 1, wherein extracting data records from the existing data sources comprises cleaning and/or translating the data records.

4. The method of claim 1, wherein identifying the entity names and the entity attributes corresponding to each of the entity names comprises associating an importance factor with each of the entity attributes.

5. The method of claim 1, wherein assigning the representative attributes data to entity attributes with missing attributes data is based on frequencies of entity attributes corresponding to the entity attributes with missing attributes data in the clustered data records.

6. The method of claim 4, wherein assigning the representative attributes data to entity attributes with missing attributes data is based on importance factor of each of entity attributes, corresponding to the entity attributes with missing attributes data, in the clustered data records.

7. The method of claim 1, wherein the method further comprises predefining the attribute signature and the identity signature.

8. The method of claim 1, wherein the clustered data records are combined to form the entity records segments based on NER algorithms.

9. The method of claim 1, wherein the entity record segments are classified prior to clustering of entity record segments.

10. A system for creating entity records using existing data sources, wherein the system comprising:
    a database arrangement operable to store existing data sources; and
    a processing module operatively coupled to the database arrangement, the processing module operable to:
        extract data records from the existing data sources, wherein the data records comprise entity names and entity attributes associated with the entity names;
        identify the entity names, and entity attributes corresponding to each of the entity names in each of the extracted data records;
        classify the identified entity attributes, based on an attribute signature associated with each of the identified entity attributes;
        cluster the data records based on similar classified entity attributes and/or similar entity names;
        compare the entity attributes in the clustered data records to identify entity attributes with missing attributes data in each of the data records;
        assign representative attributes data to the entity attributes with missing attributes data;
        combine the clustered data records to form entity record segments, wherein each of the entity record segments comprises relevant entity attributes corresponding to a relevant entity name;
        cluster the entity record segments based on similar identity signature of each of the entity record segments;
        compare the relevant entity attributes of the clustered entity record segments to identify entity record segments having a relation therebetween; and
        combine the related entity record segments to form the entity records.

11. The system of claim 10, wherein the extraction of data records from the existing data sources comprises cleaning and/or translating the data records.

12. The system of claim 10, wherein the identification of the entity names and the entity attributes corresponding to each of the entity names comprises associating an importance factor with each of the entity attributes.

13. The system of claim 12, wherein the processing module is operable to assign the representative attributes data to entity attributes with missing attributes data based on importance factor of each of entity attributes corresponding to the entity attributes with missing attributes data in the clustered data records.

14. The system of claim 10, wherein the processing module is operable to assign the representative attributes data to entity attributes with missing attributes data based on frequencies of entity attributes corresponding to the entity attributes with missing attributes data in the clustered data records.

15. The system of claim 10, wherein the processing module is operable to combine the clustered data records to form the entity record segments based on NER algorithms.

16. The system of claim 10, wherein the processing module is operable to classify the entity record segments prior to clustering of the entity record segments.

17. A computer readable medium containing program instructions for execution on a computer system, which when executed by a computer, cause the computer to perform method steps for creating entity records using existing data sources, the method comprising the steps of:
    extracting data records from the existing data sources, wherein the data records comprise entity names and entity attributes associated with the entity names;
    identifying the entity names, and entity attributes corresponding to each of the entity names in each of the extracted data records;
    classifying the identified entity attributes, based on an attribute signature associated with each of the identified entity attributes;
    clustering the data records based on similar classified entity attributes and/or similar entity names;
    comparing the entity attributes in the clustered data records to identify entity attributes with missing attributes data in each of the data records;
    assigning representative attributes data to the entity attributes with missing attributes data;
    combining the clustered data records to form entity record segments, wherein each of the entity record segments comprises relevant entity attributes corresponding to a relevant entity name;
    clustering the entity record segments based on similar identity signature of each of the entity record segments;
    comparing the relevant entity attributes of the clustered entity record segments to identify entity record segments having a relation therebetween; and
    combining the related entity record segments to form the entity records.

* * * * *